United States Patent [19]
Berger

[11] Patent Number: 5,067,167
[45] Date of Patent: Nov. 19, 1991

[54] APPARATUS AND METHOD FOR ROTATING OF THREE-DIMENSIONAL IMAGES

[75] Inventor: Scott B. Berger, New York, N.Y.

[73] Assignee: Cornell Research Foundation, Inc., Ithaca, N.Y.

[21] Appl. No.: 595,233

[22] Filed: Oct. 10, 1990

[51] Int. Cl.$^5$ .................. G06K 9/32; G06K 9/54; G06F 15/00; G09G 1/06
[52] U.S. Cl. .................. 382/46; 382/49; 340/727; 395/137; 395/119
[58] Field of Search .............. 382/46, 45, 49; 358/22; 364/522, 920.8, 731; 340/727, 729

[56] References Cited
U.S. PATENT DOCUMENTS

| | | | |
|---|---|---|---|
| 4,618,991 | 10/1986 | Tabata et al. | 382/46 |
| 4,759,076 | 7/1988 | Tanaka et al. | 382/46 |
| 4,975,977 | 12/1990 | Kurosu et al. | 382/46 |

Primary Examiner—Michael Razavi
Assistant Examiner—Michael Cmmarata
Attorney, Agent, or Firm—Perman & Green

[57] ABSTRACT

A system is described for rotating a 3D image so that a selected projection thereof is oriented to a chosen angular orientation in a three-dimensional space. The 3D image comprises a plurality of pixels, each pixel identified by a three-dimensional spatial coordinate value and a grey scale value. The system includes a data processor for storing the pixel coordinates and includes circuitry for rapidly altering the pixel spatial coordinate values to accomplish 90° rotations of the 3D image about the axes of three-dimensional space. A pipeline processor is associated with the data processor for rapidly altering pixel spatial coordinate values to orient a 3D image to an arbitrary angle, but only about an axis perpendicular to a rotator plane of the three-dimensional space. The data processor is controlled to modify the spatial coordinate values of the 3D image, to rotate the image through three-dimensional space until the selected projection of the image is coplanar with the rotator plane. The pipeline processor is then controlled to orient the reoriented 3D image to the chosen angle about the perpendicular axis to the rotator plane.

7 Claims, 2 Drawing Sheets

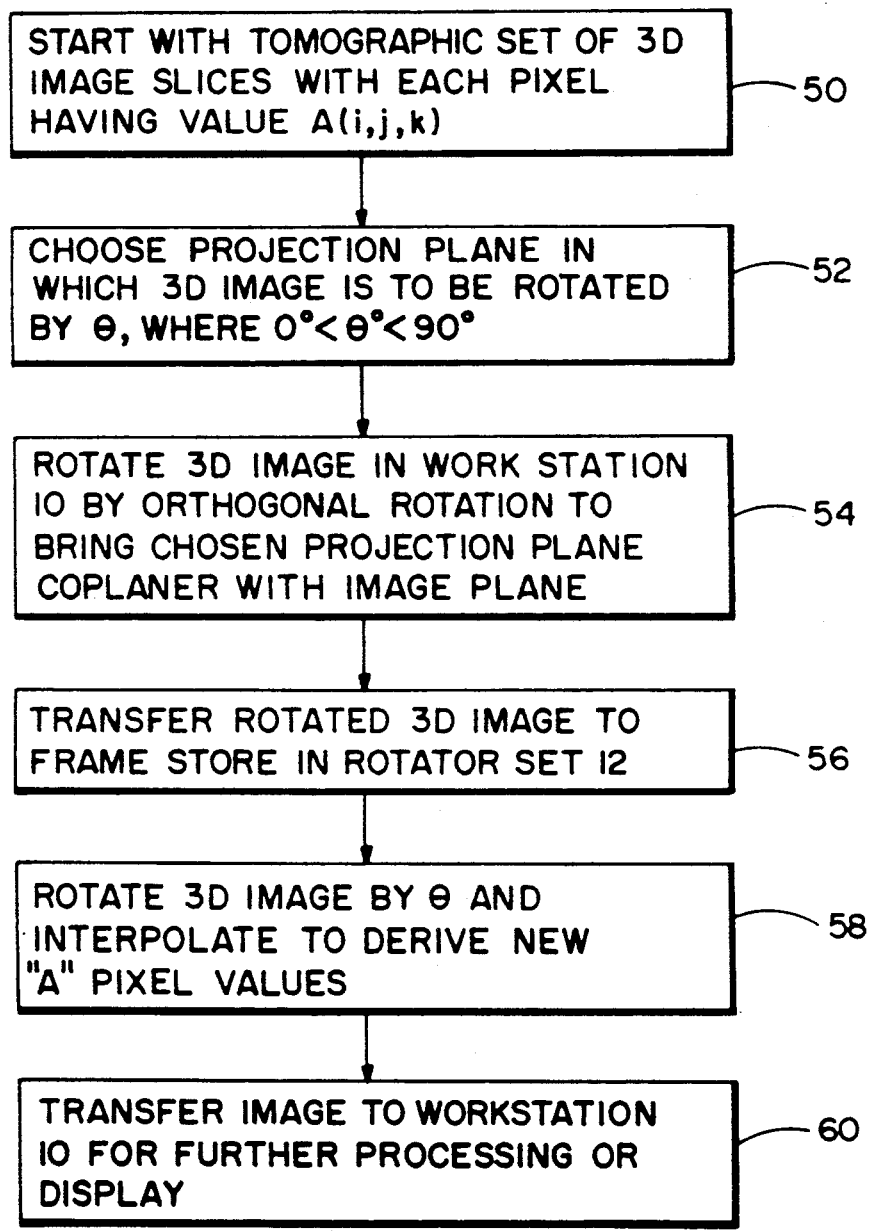

FIG. 6

| 50 | START WITH TOMOGRAPHIC SET OF 3D IMAGE SLICES WITH EACH PIXEL HAVING VALUE A(i,j,k) |

↓

| 52 | CHOOSE PROJECTION PLANE IN WHICH 3D IMAGE IS TO BE ROTATED BY θ, WHERE 0°< θ°< 90° |

↓

| 54 | ROTATE 3D IMAGE IN WORK STATION 10 BY ORTHOGONAL ROTATION TO BRING CHOSEN PROJECTION PLANE COPLANER WITH IMAGE PLANE |

↓

| 56 | TRANSFER ROTATED 3D IMAGE TO FRAME STORE IN ROTATOR SET 12 |

↓

| 58 | ROTATE 3D IMAGE BY θ AND INTERPOLATE TO DERIVE NEW "A" PIXEL VALUES |

↓

| 60 | TRANSFER IMAGE TO WORKSTATION 10 FOR FURTHER PROCESSING OR DISPLAY |

FIG. 7

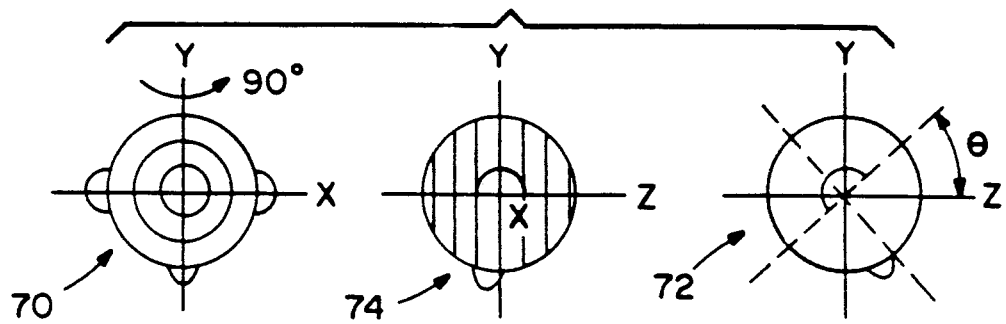

APPARATUS AND METHOD FOR ROTATING OF THREE-DIMENSIONAL IMAGES

FIELD OF THE INVENTION

This invention relates to three-dimensional (3D) imaging and, more particularly, to an apparatus and method for accomplishing rapid reorientation of a 3D image.

BACKGROUND OF THE INVENTION

In recent years, substantial innovations have been made in medical imaging that allow 3D reconstruction of highly detailed anatomical reproductions. Tomographic representations are now available from computerized axial tomography systems, positron emission tomography systems, and magnetic resonance imaging systems. These representations comprise, in essence, a set of contiguous sections or slices of an anatomical region. 3D reconstruction of biological structures from tomographic serial sections have become highly valued as diagnostic instrumentalities. One area of particular relevance for 3D reconstruction is neuroscience, in which the complicated internal structure of a brain is often impossible to visualize or analyze without the help of computer imaging methods. Due however to the masses of data required to be processed to reconstruct, manipulate and display 3D images, such images are not available on a real-time basis and may take anywhere from hours to days to construct using very powerful computers.

Recently, the quantitative analysis of brain images and brain function has been enhanced by the work of Chen et al., as reported in "Image Analysis of PET Data With the Aid of CT and MR Images", Information Processing in Medical Imaging, edited by DeGraaf et al., Plenum Press, N.Y., 1988, pp. 601–611. Therein is taught a method for overlaying tomographic PET studies onto either computerized tomography or magnetic resonance tomographic studies to enable not only neural structures to be visualized, but also neural function of various portions of the structure. The Chen et al. approach requires precise image correlations in three dimensions of the overlaid PET/MRI/CAT scans. As such, these correlations require positional adjustments of 3D images, one with respect to the other, until an optimum alignment occurs.

Notwithstanding the value of such studies, considerable processing time is required to translate and rotate the various images to achieve their accurate alignments. Because of the formidable computer tasks involved in achieving those alignments, such methodologies have been largely limited to a few laboratories with large resources for hardware and software.

A review of available three-dimensional imaging systems has recently been published, i.e., "Toward Computerized Morphometric Facilities: A review of 58 software packages for computer-aided three-dimensional reconstruction, quantification, and picture generation from parallel serial sections", Huijsmans, The Anatomical Record, Vol. 216, pp. 449–470 (1986). That review indicates that few systems are available which accommodate volume imaging and of those, all are extremely expensive.

Newly available powerful workstations have both substantial computing and random access memory capacities that provide many functions necessary for volumetric image reconstruction at moderate cost. However, interpolative operations incident to such reconstructions continue to pose a substantial problem for such work stations. An interpolative operation is one which occurs when an image is rotated by an oblique angle, translated by a non-integer offset or scaled by a non-integer factor, thereby requiring grey level adjustments to the pixels that represent the new, transformed image. In such workstations, oblique rotations, non-integer translation or non-integer scaling may require hours of central processing unit time for a 3D data set.

Another type of specialized video processor has also become available recently, applicable to a limited set of image processing applications. The Datacube Corporation, Peabody, Mass. produces a family of image processor boards called Max Video. Those processors are pipeline systems that perform special purpose, image processing functions extremely rapidly. As part of the Max Video family, Datacube markets a special purpose processor made up of three subassembly cards, an MAX-XFS card, an INTERPOLATOR card and an ADDGEN-1 card. In combination, those cards comprise a rotator assembly. The rotator assembly automatically rotates, by any prescribed angle, an image as it is being transferred from the first FRAMESTORE to the second FRAMESTORE. Those cards, together, are called a rotator set and in effect, comprise a pipeline processor which, in approximately 1/30th of a second, accomplishes a desired image rotation (including interpolation of gray values in neighborhoods of pixels to assure that the new pixel representation accurately represents the rotated image's grey values). Unfortunately, such limited function processors only have the ability to accomplish the image rotation in the image plane stored in the first frame store. As a result, while they are extremely fast in operation in that plane, they are incapable of operations in other image planes.

Accordingly, it is an object of this invention to provide an improved apparatus for the reorientation of 3D images and for the display thereof.

It is still another object of this invention to provide an inexpensive data processing apparatus adapted to reorient images in time frames comparable to much larger and more expensive data processing apparatus.

It is still another object of this invention to provide an improved method for the reorientation of 3D images, which method makes use of high speed functions in image processing apparatus, but avoids the use of less efficient image processing functions therein.

SUMMARY OF THE INVENTION

A system is described for rotating a 3D image so that a selected projection thereof is oriented to a chosen angular orientation in a three-dimensional space. The 3D image comprises a plurality of pixels, each pixel identified by a three-dimensional spatial coordinate value and a grey scale value. The system includes a data processor for storing the pixel coordinates and includes circuitry for rapidly altering the pixel spatial coordinate values to accomplish 90° rotations of the 3D image about axes of a three-dimensional space. A pipeline processor is associated with the data processor for rapidly altering pixel spatial coordinate values to orient a 3D image to an arbitrary angle, but only about an axis perpendicular to a rotator plane of the three-dimensional space. The data processor is controlled to modify the spatial coordinate values of the 3D image, to rotate the image through three-dimensional space until the selected projection of the image is coplanar with the rotator plane. The pipeline processor is then controlled to orient the reoriented 3D image to the chosen angle about the perpendicular axis to the rotator plane.

BRIEF DESCRIPTION OF THE DRAWINGS

FIG. 6 is a high level flow diagram illustrating the operation of the embodiment of FIG. 1.

FIG. 7 is a representation of the rotation of a three-dimensional image, as carried out by the embodiment shown in FIG. 1.

DETAILED DESCRIPTION OF THE INVENTION

Figure 1:
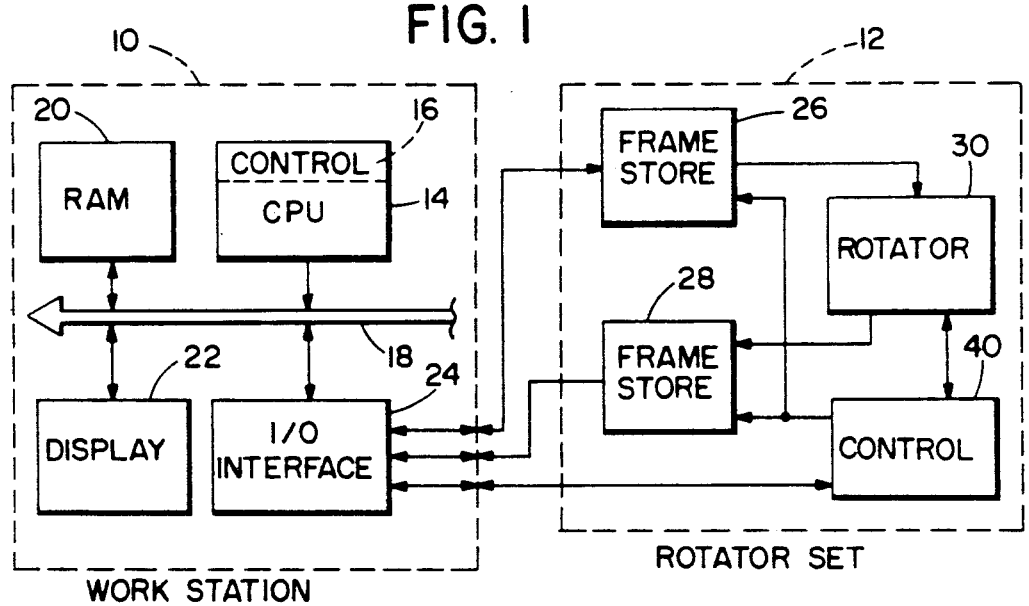
FIG. 1 is a high level block diagram of a preferred embodiment for carrying out the method of the invention.

Referring now to FIG. 1, the invention comprises two assemblies, a workstation 10 and a rotator set 12. Workstation 10 is a high performance data processing system such as a model 3/110 marketed by the Sun Corporation, Mountain View, CA. Workstation 10 comprises a central processing unit (CPU) 14 which has a software operated control portion 16 included therein. CPU 14 communicates with the other elements of the processing system via bus 18 which is, in turn, connected to random access memory 20, display 22 and I/O interface 24. Workstation 10 has connected thereto a rotator set 12 which comprises a pair of frame stores 26 and 28 connected through a rotator module 30 and a control module 40.

It is to be understood that the showings of both workstation 10 and rotator set 12 are schematic and that a number of functions have not been shown for clarity's sake. For instance, rotator set 12 actually comprises five boards manufactured by the Datacube Corporation as follows: two FRAMESTORES, a MAX-XFS transposing frame store which contains two complete frames for video storage; an INTERPOLATOR board which performs sub-pixel multi-rate sampling in real time; and an ADDGEN-1 board which is an address generator module that works in conjunction with the interpolator module to create addressing necessary to allow that module to perform first order transformations for spatial resolution purposes.

Workstation 10 is particularly adapted to the handling of three-dimensional image data stored in RAM 20. As indicated in the introduction to the specification, it is often required that a stored 3D image be reoriented so as to be coincident with another image (e.g., the reorientation of a PET 3D tomographic scan to overlay a 3D MRI tomographic scan.) Under such circumstances, CPU 14 is particularly adapted to rapidly rotate an image stored in RAM 20 by 90° increments.

Figure 2:
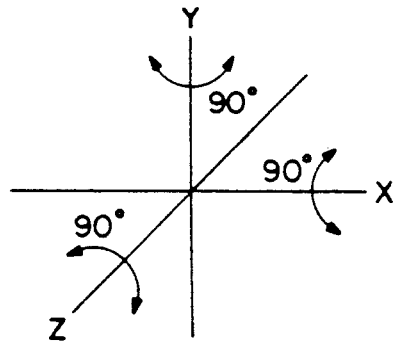
FIG. 2 is a set of orthogonal spatial axes indicating optimum 3D image rotation capabilities of the workstation shown in FIG. 1.

As shown in FIG. 2, such a rotation can occur in about any of the orthogonal axes in a three-dimensional image space. As is well-known, each picture element, (pixel) is comprised of a grey value A in addition to a set of values indicative of the pixel's coordinates in three-dimensional space (i.e., i, j, k). To accomplish the rotation of such an image by 90°, any pixel having the value A(i,j,k) can be rotated by simply transposing a coordinate value from one position in the expression to another. For instance, if it is desired to rotate pixel A(i,j,k) by 90° in the XY plane, the processor merely reverses the positions of the i and j values in the expression, to result in A (j, i, k). This simple transposition can be accomplished, on a pixel by pixel basis, extremely rapidly in CPU 14.

Figure 4:
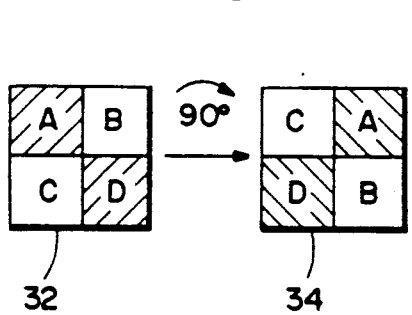
FIG. 4 is a schematic of a representative set of pixels, both before and after a 90° rotation.

Such a transformation is shown in FIG. 4 wherein four pixels A, B, C, and D have overlaid thereon an image square 32 that is divided into four subsquares, with the upper left and lower right diagonal subsquares being shaded. To rotate the pixel representation shown at 32 by 90° to the pixel representation shown at 34, the coordinate values of each of pixels A-D are modified as above stated by a simple transposition of their coordinate values. No change in the grey values of each pixel is required, as the 90° rotation of the image is still aligned, on a pixel by pixel basis, with underlying pixels A-D. Such a rotation can be accomplished, assuming a 256×256 pixel image in approximately 1 second.

Figure 5:
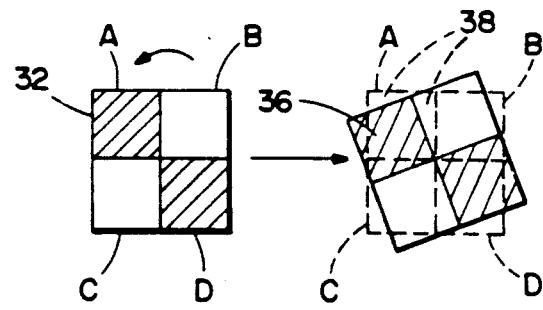
FIG. 5 is a schematic of a representative set of pixels both before and after a less than 90° rotation

If, as shown in FIG. 5, original image 32 is to be rotated in a counterclockwise direction by a small angle (less than 90°), it can be seen that the grey value for pixel A will now comprise both a shaded portion 36 and unshaded portions 38. The actual grey value of pixel A will thus be determined, by an interpolation calculation which, if performed in workstation 10, requires a large amount of processing time. An identical calculation will be required for each of pixels B, C, and D. If these calculations are carried out in workstation 10, an oblique rotation of a 256×256 pixel image can take up to 5 minutes. Since the volume may be represented as a set of 128 serial sections, the overall time required for an oblique rotation would be either 640 minutes (128 * 5 minutes for a Sun data processor) or approximately 4.27 seconds (128 * 1/30th second for the Datacube rotator set).

Figure 3:
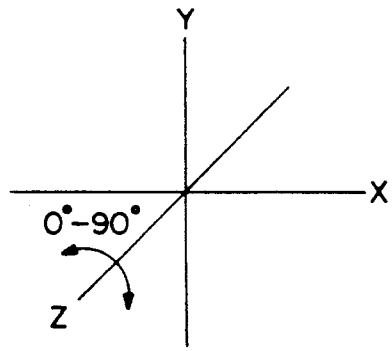
FIG. 3 is a set of orthogonal axes indicating optimum image rotation capabilities of the rotator set shown in FIG. 1.

Referring back to FIG. 1, rotator set 12 is particularly adapted to performing oblique rotations about the Z axis, assuming that frame store 26 holds an image which is present in the XY plane (see FIG. 3). When frame store 26 is operated by control module 40 to feed an image to rotator 30 and thence into frame store 28, the image, as it passes through rotator 30 is automatically rotated by the specifically chosen angle, on-the-fly. As is known, rotator module 30 employs a skewing and summing algorithm to accomplish the rotation of groups of pixels on a substantially parallel basis, so that extremely rapid rotation of the image in frame store 26 is achieved as it passes into frame store 28. For instance, rotator set 12 can perform a rotation and interpolation of a 256×256 pixel image in approximately 1/30th of a second.

In summary therefore, it can be seen that workstation 10 is capable of performing 90° rotations of an image in extremely rapid fashion, whereas rotator set 12 is capable of performing an extremely fast rotation of an image, but only about an axis which is perpendicular to a single plane of that image.

In FIG. 6, an algorithm used to control the operation of the workstation/rotator set shown in FIG. 1 is illustrated. It will be described in conjunction with FIG. 7, wherein an exemplary 3D image rotation is shown. Initially in RAM 20, a tomographic set of 3D image slices is stored with each pixel having the value A(i,j,k) (box 50). An operator then chooses the projection plane in which the 3D image is to be rotated by some angle $\theta$ where $\theta$ is other than 90° or an integer multiple thereof.

Referring to FIG. 7, and in particular view 70, it can be seen that a series of tomographic slices of a head are shown oriented in the XY view plane. If it is assumed that the user wishes to rotate 3D image 70 by an angle $\theta$ about the X axis (such as shown at 72), it can be seen that the reorientation of the head slice pixels can be accomplished by first rotating image 70 about the Y axis by 90° to result in image 74, and then rotating image 74 about the X axis by $\theta$ to accomplish image 72.

Those rotations are accomplished by utilizing workstation 10 to perform the orthogonal rotations to orient an image plane (in which the oblique rotation is to subsequently occur) to be coplanar with the view plane. Thus, as shown in box 54, FIG. 6, image 70 is rotated in workstation 10 by 90° about the Y axis, to bring its chosen rotation plane (image 74) coplanar with the image plane (from a viewer's perspective). Then, the pixels representing the rotated 3D image are transferred to frame store 26 in rotator set 12 (box 56). Therein, the rotated 3D image is again rotated by angle $\theta$ and the grey scale values (A) for each pixel are interpolated to arrive at new grey scale values for the rotated pixels (box 58). At this point, the image is then transferred back to workstation 10 via I/O interface 24 for either further processing or for display on display 22.

It can thus be seen from the above that whereas workstation 10 can take up to 5 minutes per image to do an oblique rotation (assuming a 256 by 256 pixel image), such a rotation can be achieved in a small fraction of that time by relegating to the rotator set the oblique rotation (accomplished in 1/30th of a second). It should be understood that although all operations of the invention are performed on 2D images, which are composed of pixels (picture elements), the overall effect is to perform operations on the 3D volume, which is composed of voxels (volume elements). Since the slices are considered to be of some finite thickness, the elements of the 2D slices are really voxels.

It should be understood that the foregoing description is only illustrative of the invention. Various alternatives and modifications can be devised by those skilled in the art without departing from the invention. For instance, while specific manufacturer's equipments have been described, any equipments which exhibit similar functions and capabilities are contemplated as being usable with this invention. Accordingly, the present invention is intended to embrace all such alternatives, modifications and variances which fall within the scope of the appended claims.

I claim:

1. A system for rotating a three-dimensional image so that a selected projection thereof is oriented to a chosen angular orientation in a three-dimensional space, said three-dimensional image comprising a plurality of pixels, each said pixel identified by a three-dimensional spatial coordinate value and a grey scale value, said system comprising:

data processing means for storing said pixel coordinates, and including means for rapidly altering said pixel spatial coordinate values to accomplish 90° rotations of said three-dimensional image about axes of said three-dimensional space;

a pipeline processor for altering pixel spatial coordinate values to rotate a three-dimensional image to an arbitrary angle, but only about an axis perpendicular to a rotator plane of said three-dimensional space;

means for controlling said data processing means to modify spatial coordinate values of said three-dimensional image to rotate said image through said three-dimensional space until said selected projection of said image is coplanar with said rotator plane in order to obtain an oriented three-dimensional image; and means for controlling said pipeline processor to to rotate said oriented three-dimensional image to said chosen angle about said perpendicular axis to said rotator plane.

2. The system as recited in claim 1 wherein said pipeline processor comprises:

first and second frame stores; and
rotator means connecting said frame stores.

3. The system as recited in claim 2 wherein said data processing means comprises:

means for loading said modified spatial coordinate values of said three-dimensional image into said first frame store and actuating said pipeline processor to alter said spatial coordinate values and insert them into said second frame store, whereby said 3D image is reoriented to said chosen angular orientation.

4. The system as recited in claim 3 wherein said data processing means performs no grey scale interpolations in the process of accomplishing a said 90° rotation of said three-dimensional image.

5. The system as recited in claim 4 wherein said rotator in said pipeline processor means performs grey scale interpolation in the course of reorienting said three-dimensional image to said chosen angular orientation.

6. A method for rotating a three-dimensional image so that a selected planar projection thereof is oriented to a chosen angular orientation, said method employing a general purpose computer capable of rotating said three-dimensional image by 90° increments about orthogonal axes in a three-dimensional space, and a special purpose processor capable of orienting a three-dimensional image to an arbitrary angular orientation, but only about an axis perpendicular to a selected plane; said method comprising the steps of:

a. operating said general purpose computer to rotate said three-dimensional image by 90° increments so that said selected planar projection, thereof is coplanar with said selected plane in order to obtain an oriented three-dimensional image; and b. operating said special purpose processor to to rotate said oriented three-dimensional image to said chosen angular orientation in said selected plane.

7. The method as recited in claim 6 comprising the further step of:

a1. transferring to a frame store in said special purpose processor, pixel coordinates of said rotated three-dimensional image.

* * * * *